March 21, 1939. F. J. RODE ET AL 2,151,153
FLUID OPERATED CLUTCH DEVICE
Filed Sept. 30, 1937 2 Sheets-Sheet 1
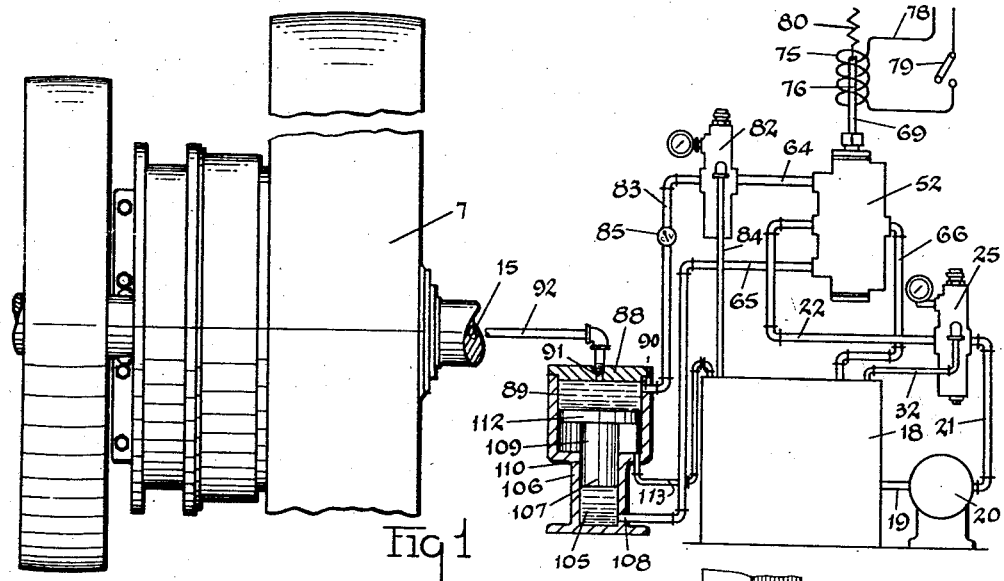
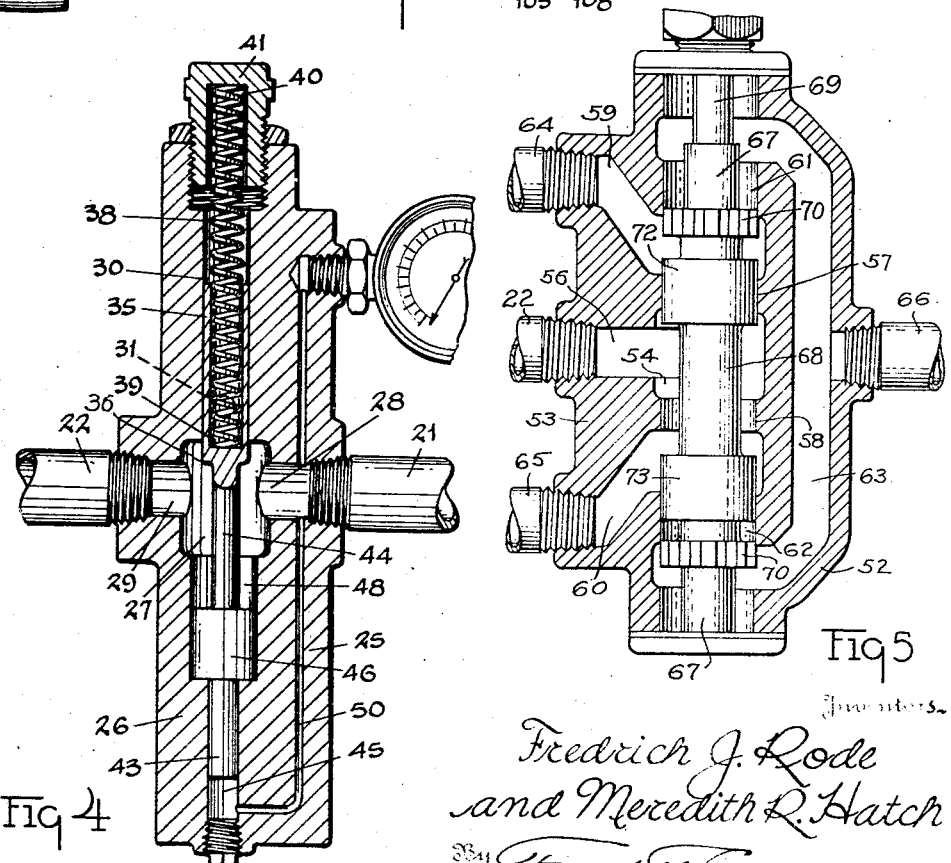
Inventors
Fredrich J. Rode
and Meredith R. Hatch

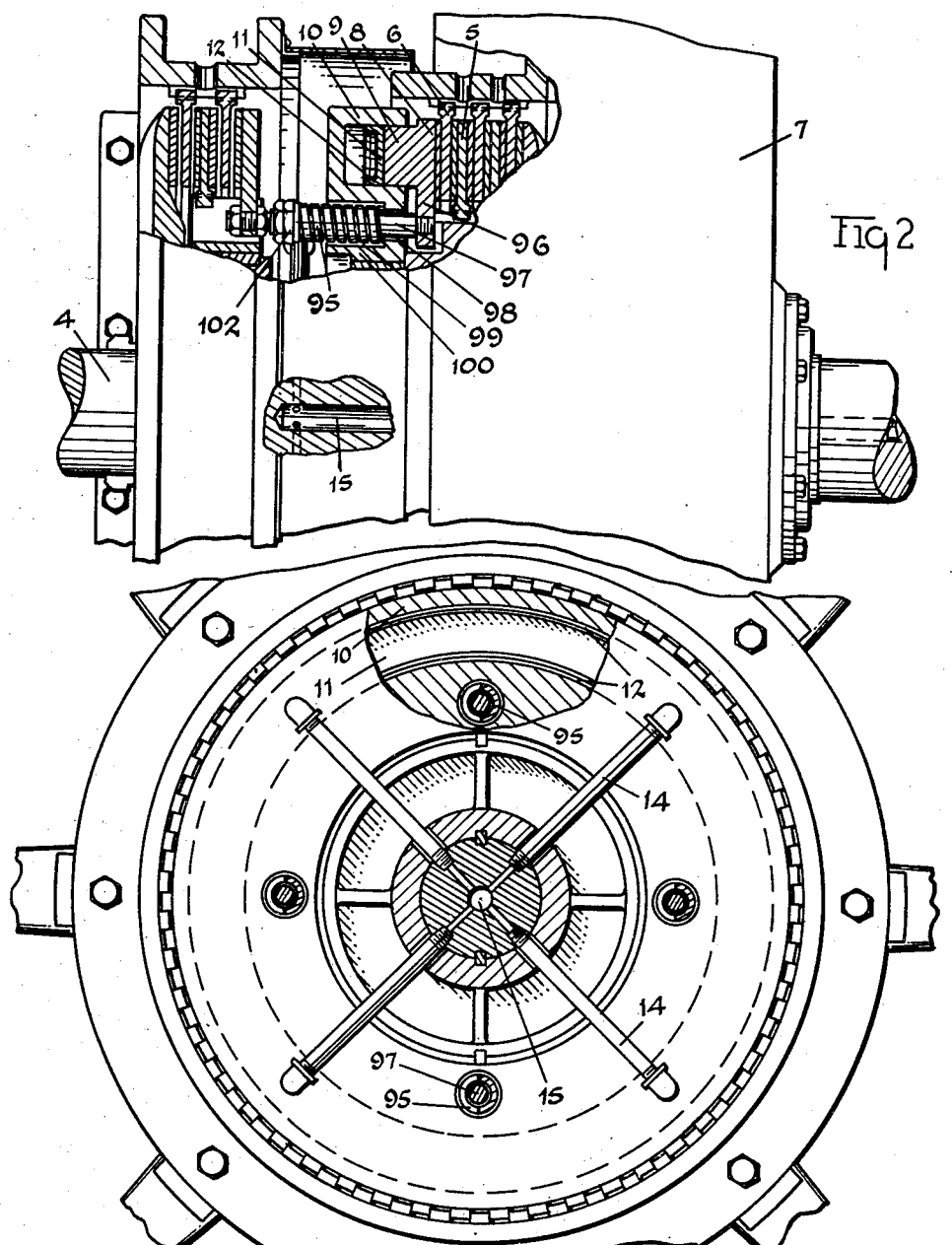

Patented Mar. 21, 1939

2,151,153

UNITED STATES PATENT OFFICE 2,151,153

FLUID OPERATED CLUTCH DEVICE

Fredrich J. Rode and Meredith R. Hatch, Toledo, Ohio

Application September 30, 1937, Serial No. 166,522

9 Claims. (Cl. 192—85)

Our invention relates generally to clutch and brake devices for connecting a rotative element to another element, such as, in the transmission of a driving power from a source of power to a driven element or in the exertion of a braking power as between a driven element and a member resistant to movement. The invention relates particularly to a fluid operated clutch or brake device which may be actuated at the will of the operator, and contemplates that the driven element be of great mass or connected thereto so that the inertia, both static and kinetic, exerted by the driven element produces considerable resistance to the clutching or braking operation of the device. The invention further contemplates displacement of the fluid operating means to a point removed from the clutch or brake device by reason of the mass of the driven element or the machinery connected thereto and to accommodate for the consequent occupancy of space thereby.

Our invention has for an object to provide fluid operated clutch and brake devices having fluid operating means therefor whereby the force exerted by a fluid may be applied substantially instantly, upon actuation, through a fluid from a source of impressment to a point of useful exertion on the clutch or brake device. As is well known, in clutching or braking a driven element of great mass with either a source of power in one case or with a braking unit in the other, substantially instant, as well as forceful, actuation of the clutch or brake device, whichever the case may be, is very desirable to prevent undue and prolonged frictional dragging and burning of the clutch or brake discs and to insure against undesired and often destructive over-running of the driven element or machinery connected thereto.

The invention has for another object to provide fluid operated clutch and brake devices having fluid operating means therefor whereby a large volume of fluid may be moved toward device actuation in direct response to the movement of a lesser volume of fluid. Further, in this connection, it is an object of our invention to provide fluid operating means whereby a volume of fluid under low pressure is further impressed by another volume of fluid under a high pressure. Finally, in this connection, an object of our invention is to provide fluid operating means whereby a large volume of fluid at low pressure is moved toward device actuation and impressed by a lesser volume of fluid at high pressure. Thus, it will be appreciated that speedy actuation of the clutch and brake devices may be effected by reason of the fact that only movements of a small volume of fluid is required to effect both movement and impressment of the larger device actuating volume.

Another object of the invention is to provide means for supplying a quantity of the fluid to fluid operated clutch and brake devices to compensate for a natural, incurable and undeterminable loss of the fluid from the device during operating or dwelling periods. Those skilled in the art recognize that notwithstanding precisional machining of the clutch or brake device parts, there will be practical losses due to escape of the fluid from the clutch or brake device. Our invention provides for automatically supplying a compensating quantity of the fluid to supplant that loss and so that operation of the clutch and brake device will not be unduly delayed by the absence and consequent replenishment of the fluid.

Further, in this connection, our invention has for an object to provide means for resisting the fluid pressures necessary to supply said loss compensating quantities of the fluid to the clutch or brake device during periods of dwell thereof to produce pressures of a degree merely sufficient to maintain such self-sealing glands, rings, gaskets, and like members of the clutch or brake device in expanded position whereby they may efficiently perform their appointed sealing function to resist escape of the fluid. Those skilled to the practicalities of the art recognize that self-sealing units perform most efficiently at certain recognized pressures despite theoretical statements to the contrary. An embodiment of our invention, recognizing this fact, produces at dwell or rest periods of the clutch or brake device, a fluid pressure of only that minor degree sufficient to secure greatest sealing efficiency of the sealing units of the clutch or brake device.

The invention has for a further object to provide fluid operated clutch and brake devices having means resisting pressures tending to operate the device of a magnitude less than a predetermined high pressure sufficient to insure substantially positive engagement of the frictional members of the device. Thus, said means functions to prevent burning of the faces of said frictional members induced by prolonged relative slippage and drag and insures substantially snap action in bringing the frictional members into positive power transmitting relation.

A particular object of our invention is to provide fluid operating means for fluid operated clutch and brake devices that is so related and functions that the fluid delivering and impressing unit of said means, which in some instances may be a mechanically driven pump, is permitted periods of respite in the production of necessarily high device operating pressures. Thus, the invention provides means which contributes materially to the impressing unit's longevity and resultant efficiency at working periods.

Another particular object of the invention is to provide a liquid operated clutch or brake device having a liquid operating means in which the liquid pressure control units present no restriction or obstruction to the substantially free movement of the liquid. Consequently, the movement of the liquid to actuate the device may be accomplished with a considerable speed not found in liquid operated devices of like character in the art. So also may discontinuance of actuation be speedily effected to produce a desired clean and abrupt disengagement of the frictional members of the device upon unclutching or disengagement of the brake.

A still further and more particular object of our invention is to provide a fluid pressure operated clutch or brake device having but a minimum of conduiting and, therefore, of extreme simplicity notwithstanding its high efficiency and adaptability. This feature is of real importance when considered in connection with the cost of production and installation and in connection with its acceptance by potential users.

The invention consists in other features and advantages which will appear from the following description and upon examination of the drawings. Structures containing the invention may partake of different forms and still embody the invention. To illustrate a practical application of the invention, we have selected a fluid operated clutch device as an example of the various structures and details thereof that contain the invention and shall describe the selected structure hereinafter, it being understood that variations may be made without departing from the spirit of the invention. The particular structure selected is shown in the accompanying drawings and described hereinafter.

Fig. 1 of the accompanying drawings illustrates an embodiment of our invention, the fluid means being shown diagrammatically and connected to a combined clutch and brake device illustrated in partial perspective. Fig. 2 illustrates an enlarged view of the clutch and brake device shown in Fig. 1, parts being shown broken away to facilitate disclosure of the details thereof. Fig. 3 illustrates an enlarged longitudinal section of the clutch and brake device shown in Fig. 1. Fig. 4 illustrates an enlarged sectional view of a unit of the fluid means illustrated in Fig. 1. Fig. 5 illustrates an enlarged sectional view of another unit of the fluid means illustrated in Fig. 1.

The clutch device may have the usual elements well known to the trade, such as a plurality of clutch driving rings 5 mounted on a driving shaft 4 and disposed in adjacent alternate relation to a plurality of driven discs 6 mounted on the driven fly wheel 7. The rings 5 may be urged toward frictional engagement with the discs 6 by the clamping force exerted by a movable end plate 8. As shown, the end plate 8 has an annular piston part 9 which is disposed within an annular cylinder 10 mounted on the shaft 4. The face of the piston part 9 may be provided with a conventional expandible annular self-sealing gasket, such as that shown at 11, having edge skirts 12 which tend to engage the side walls of the cylinder 10, when a fluid medium under pressure is introduced therein. The cylinder 10 is connected by suitable conduits 14 to a main conduit 15 to which the fluid impressing means of our invention is connected. Thus, when a fluid is introduced through the conduits 15 and 14, the piston part 9 tends to move the plate 8 to effect frictional engagement between the clutch discs and rings and clutching as between the driving shaft 4 and fly wheel 7.

Broadly viewed, the fluid operating means of our invention includes a primary reservoir for containing a source of supply of a fluid, such as oil, a fluid delivering device having a capacity to impress the fluid in order to effect delivery thereof connected to the primary reservoir, a valve for selectively directing the fluid to an intermediate or secondary fluid reservoir or to a fluid actuated device for displacing and impressing the fluid contained within the secondary reservoir. In the particular construction illustrated diagrammatically in Fig. 1 of the drawings, the primary reservoir or sump 18 is connected by a suitable conduit pipe 19 to the fluid delivering means or motor driven pump 20 for withdrawing the oil from the sump 18 and delivering a substantially constant volume notwithstanding developed pressures resistant to said delivery within certain practical limitations. The oil is delivered from the pump 20 to a conduit pipe 21. The conduit pipe 21 is connected to a conduit pipe 22 by a monitor means for delivering the oil to the pipe 22. Said monitor means is shown embodied in the element 25.

The element 25 has a casing 26 in which a chamber 27 is formed. The chamber 27 has ports 28 and 29 to which the pipes 21 and 22 are respectively connected and through which they communicate with the chamber. The casing 26 is cored to form an auxiliary passageway 30 communicating with the chamber 27. The passageway 30 has a port 31 through which the chamber may communicate with the sump 18 by means of a suitable conduit pipe 32. A valve member 35 is slidably supported in the passageway 30. Means for moving the valve member 35 to positions of covering and uncovering relation to the port 31 is provided. Preferably, to provide for automatic operation of the valve member, the valve member is maintained and biased toward port covering positions by a means counteractive to a hydraulic pressure within the pipe 21 and is adapted to be moved to positions of port uncovering by a means responsive to a hydraulic pressure within the pipe 21. In the particular construction shown in the drawings, the said counteractive means is embodied in a spring 38, one end of which is seated in a recess 39 formed in the valve member 35 and the other end in a recess 40 formed within a threaded thimble 41. The thimble 41 is threadably connected to the casing 26 so that rotation of the thimble will vary the degree of compression of the spring 38 and the force exerted thereby on the valve member 35 tending to urge the same toward a port covering position. The said pressure responsive means of the hereindescribed structure is embodied in a piston 43 mounted on a stem 44 connected to the valve member 35. Preferably, the piston 43 is slidably supported in a cylinder 45 formed within the casing 26 and has a guiding and limiting shouldered shank portion 46 slidably supported in a guide passage 48 extending from the chamber 27. The valve member 35 may have a suitable shoulder 36 on which the oil under pressure in the valve chamber 27 may exert to somewhat compensate and substantially balance the pressure effect in the passage 48 on the shank portion 46. The cylinder 45 is connected to the port 28 by a conduit or passageway 50 so that oil may be conducted from the pipe 21 to the cylinder 45. Thus, when the oil pressure within the pipe 21 reaches an undesired magnitude, as determined by the degree of compression of the spring 38, say for example, greater than 500 pounds per square inch, the piston 43 is caused to move within the cylinder 45, moving the valve member 35 to port uncovering position and permitting the oil to pass through the port 31 and pipe 32 to the sump 18. While the port 31 remains thus uncovered, it will be seen that the oil returned to the sump will cause, by its withdrawal at a point between the pipes 21 and 22, a reduction of pressure in the oil delivered by the element 25 to the pipe 22. When the pressure in the pipe 21 is reduced to the desired constant pressure, the spring 38, no longer being opposed by the action of the pressure-responsive piston 43, will cause the valve member 35 to move to covering position with respect to the port 31.

The conduit pipe 22 connects the element 25 with a suitable master control four-way valve 52. The valve may be of the construction illustrated in Fig. 5 of the accompanying drawings having a casing 53 and valve chamber 54. The chamber 54 has ports 56, 57 and 58. The pipe 22 is adapted to be connected to the port 56 and to communicate with the chamber 54 therethrough. The ports 57 and 58 provide communication between the chamber 54 and passageways 59 and 60, respectively. The passageways 59 and 60 are, preferably, formed in the casing 53, each having respective ports 61 and 62 which communicate with a common passageway 63, formed preferably in the casing 53. The passageways 59, 60 and 63 are connected to conduit pipes 64, 65 and 66, respectively. The master control valve 52 has a valve member 68.

The valve member 68 is supported by an operating stem 69 for movement in the valve chamber. If desired, the valve member may be borne and guided in its sliding movements within the casing 53 by a pair of bearing spurs or splines 70 that are adapted to slidably engage the surface of the casing surrounding the respective ports 61 and 62. To positively limit the extent of endwise movement of the valve member 68 to only that required movement, the valve stem 69 may have suitable shoulder portions 67 which are adapted to engage portions of the valve casing 53, when the valve member is moved to its various positions hereinafter described. The valve member is provided with a pair of valve heads 72 and 73 adapted to be moved into closing and opening position with respect to each of the ports 57 and 58. The valve heads 72 and 73 are so disposed on the valve member that when either port 57 or 58 is open, the other port is closed. Thus, when the port 57 is opened, the oil is conveyed therethrough, through the passageway 59 and delivered to the pipe 64 and when the port 57 is open, the oil is conveyed therethrough, through the passageway 60 and delivered to the pipe 65.

The valve member 68 may be caused to move in any desired manner subject to the control of the operator. In the form shown, electromagnetic motor means is provided in the solenoid 75. One end of the stem 69 is connected to the movable core 76 of the solenoid 75. The solenoid is connected in a circuit, indicated at 78, which may be completed and broken by action of the switch 79, operable by the operator. When the switch 79 is operated to close the circuit 78, the stem 69 is moved against the bias of a suitable spring 80 connected to the stem to locate the head 73 in opening relation to the port 58 and the head 72 in closing relation to the port 57 to convey the oil from the pipe 22 to the pipe 65. During such position, surplus oil from the pipe 64 may drain and exhaust therefrom through the passageway 59, the port 61, the passageway 63 into the sump pipe 66 which is connected with the sump 18. When the switch 79 is operated to open the circuit 78, the spring 80 causes the return movement of the stem 69 to locate the head 72 in opening relation to the port 57 and the head 73 in closing relation to the port 58. When in such position, surplus quantities of oil from the pipe 65 may exhaust through the passageway 60 and the pipe 62 into the passageway 63 and to the sump 18 by way of the sump pipe 66.

The pipe 64 conveys the oil received from the master control valve 52 to a second monitor means shown embodied in the element 82. The element 82 connects the pipe 64 with the pipe 83 and is, preferably, of the same construction as the above described element 25. In the form shown, however, the action of the element 82 to return oil to the sump 18 by way of the sump pipe 84 is initiated at a much lower pressure in the pipe 64 than the pressure in the pipe 21 necessary to initiate the return of the oil to the sump from the element 25. In the particular instance of the hereindescribed structure, the initiating pressure of the element 82 is of the order of five pounds per square inch.

The pipe 83 conveys the oil through a suitable one-way valve 85 and to an intermediate or secondary reservoir 88. The secondary reservoir 88 is formed to have a reservoir chamber 89 into which the oil from the pipe 83 is received through the port 90 formed in the wall of said chamber. A second port 91 in the chamber wall provides communication with a conduit pipe 92. The conduit pipe is connected by suitable coupling means (not shown) to the main conduit 15. When, therefore, due to the position occupied by the valve member 68 in the master control valve 52, the oil is conveyed from the pipe 22 to the pipe 83, the intermediate reservoir chamber 89 is kept ever filled with said oil, as is also the pipe 92, main conduit 15, conduit 14, and that part of the cylinder on the working side of the face of the annular piston 9 not occupied or displaced by the piston when the same is in a non-working position. It will be further noted that when a sufficient quantity of the oil has been delivered to said chamber 89, pipe 92, conduits 15 and 14 and cylinder 10 to fully occupy the space defined thereby, further delivery of oil thereinto will cause impressment of said oil. Due to the control exercised by the monitor element 82, the oil will be maintained in such occupancy of said chamber, conduits and cylinder at a low, but sufficient, pressure not only to insure supplying compensatory quantities of the oil for that lost by leakage, but also to maintain the expandible sealing glands and leathers, such as the gasket 11 and its skirt 12, expanded to enable efficient performance of the sealing function.

A means resisting said low pressure may be provided for restricting the tendency of the piston 9 to move in response to said low pressures in the cylinder 10. In the particular construction shown, said means is embodied in a plurality of springs 95 which are connected to a flange extension 96 of the piston part 9. Preferably, said connection of each spring 95 consists in a pin 97, slidably supported in an opening 98 formed in a recess 99 of an extension 100 from the body of the cylinder 10. One end of the pin 97 is threaded into the flange 96 and the associated spring 95 is placed over the other end of said pin to locate one end of the spring against the wall of said recess 99. The pin is provided, preferably, with a washer and nut combination 102 against which the other end of the spring 95 bears. Thus, movements of the piston 9, in response to pressures in the cylinder 10, will be yieldingly resisted by conjoint compression of said springs 95.

The pipe 65, when the valve member of the master control valve 52 is positioned to interconnect the pipe 22 therewith, conveys the oil to an intermediate or secondary impressing means. In the form shown in the accompanying drawings, said secondary impressing means is embodied in a cylinder 105 formed in a block 106, integral with the intermediate reservoir 88, and a piston 107. The cylinder 105 has a port 108 to which the pipe 65 is connected and through which the oil is conveyed from said pipe into the cylinder. The piston 107 is reciprocably supported in the cylinder 105 by a stem portion 109. The stem portion 109 extends through and substantially seals a passageway 110 extending between the cylinder 105 and the reservoir chamber 89. A plunger 112 is connected to that end of the stem portion 109 which extends into the reservoir chamber 89. In order to carry off such oil as by-passes the plunger 112, during operation thereof, to the sump 18 and to connect that part of the cylinder 89 on the non-working side of plunger 112 with the atmosphere and, thus, to prevent the establishment of pneumatic differentials within the cylinder 89, a drain conduit 113 connects cylinder 89 with the sump 18. The plunger 112 is supported in sliding contact with the walls of the reservoir chamber 89 and is of a dimension sufficient to effect substantially complete displacement and compression of the contents thereof in a working stroke of the piston 107. Preferably, the face of the plunger 112 has a greater working area than the face of the piston 107 and thus, when the piston 107 moves in response to the entrance of a small volume of oil into the cylinder 105, a movement of a considerable and larger volume of the oil from the reservoir chamber 89 to the cylinder 10 will be effected. Having observed heretofore that a quantity of oil is already in full occupancy of the space defined by the chamber 89 and cylinder 10 and their interconnections, it will be appreciated that displacement of said oil in the chamber 89 by the plunger 112 will be resisted and that continued delivery of oil to the cylinder 105 will generate a pressure in pipes 65, 22 and 21 which increases in magnitude with the unchanging delivery of oil by the pump 20. The said pressure may increase to a magnitude until the operation of the element 25 is initiated to return oil to the sump 18. Thus, the increasing pressure is transmitted through the piston 107 and plunger 112 to exert a pressure lower than that, but proportionate, as the areas of the working faces of the plunger and piston are related, to the pressure prevailing in the cylinder 105. It will be marked by those skilled in the art that by our invention, a means is, therefore, provided for moving a considerable volume of oil under operating pressure from the reservoir chamber 89 to the working cylinder 10 with such rapidity as to overcome the characteristic sluggishness and inertia of the oil and compensate for the resistance to work exerted by the walls of the conduits 92, 15 and 14. Thus, our invention enables the location of the hydraulic means at a point remote from the point of work, thereby accommodating for practical operating conveniences not found in the art without losses in efficiency commonly characteristic to such remoteness.

In operation, the operator closes the switch 79 to complete the solenoid circuit 78 moving the valve member 68 to connect the pipe 22 with the pipe 65. The oil is conveyed to the cylinder 105 and exerts itself against the face of the piston 107. Movement of the piston 107 causes movement of the plunger 112, tending to displace the quantity of oil within the reservoir chamber 89 and thereby transmitting force through said quantity of oil tending to cause movement of the piston 9 and clutch clamping plate 8 to clamp the clutch discs 6 and rings 5 and thereby clutch-connecting the driving shaft 4 and driven fly wheel 7. The movement of the piston 9 to effect clutching is resisted by the heretofore described springs 95 which form not only means permitting low prevailing pressures in the cylinder 10 at dwell periods of the clutch but also form means insuring the development of a pressure in the said fluid quantity as exerted on said piston 9 sufficient in magnitude to effect positive inter-seizure as between the clutch rings and discs when the piston 9 moves the clamping plate 8 to clamping positions. In the device shown herein, a pressure greater than 30 pounds per square-inch is required before adequate compression of the springs 95 may be effected to enable clamping. Adjustment of the degree of normal compression of the springs 95 may be effected by variation of the position of the washer and nut combination 102 on the pin 97 to vary the pressure at which the piston 9 may operate in accordance with various desired results. Said springs also provide means for effecting return of the piston 9 to a non-working position after movement to working positions, as will be described hereinafter.

When the clutch is engaged, the pipe 64 is connected through the master control valve 52 with the pipe 66 and excess oil may be returned therefrom into the sump 18. When the operator opens the switch 79 to break the solenoid circuit 78, the spring 80 causes the valve member 68 to move to a position connecting the pipe 22 to the pipe 64 and the pipe 65 to the pipe 66 through the master control valve 52. The springs, 95, having been under compression, quickly move the piston 9 toward a non-working position displacing a volume of oil from the cylinder 10 through conduits 14 and 15 and the pipe 92 into the reservoir chamber 89. The entrance of the said oil into the chamber 89 causes movement of the plunger 112 with a resultant movement of the piston 107 displacing a volume of oil in the cylinder 105 which is conveyed back through the pipe 65 through the master valve 52 to the pipe 66 and the sump 18. Thus, it will be seen that the pipe 65 also serves as a return line to the sump. The pipe line 64, having been connected to the pipe 22, oil is again delivered to the intermediate reservoir chamber 89. Upon reclosure of the switch 79, the above described cycle of operation is again initiated.

It is appreciated and contemplated that the above described particular clutch may be substituted with a fluid operated brake or that the clutch may be combined with a braking device as shown in the drawings and particularly described in our United States Letters Patent No. 2,009,301, issued July 23, 1935.

While in accordance with the provisions of the statutes, we have illustrated and described the best form of our invention now known to us, those skilled in the art will readily understand that many changes may be made in the form of construction disclosed, without departing from the spirit of our invention as set forth in the appended claims.

We claim:

1. A clutch device for interconnecting a rotative element to another element, said clutch device including friction members mounted on the said elements and a fluid pressure operated part for effecting frictional engagement between the friction members, a fluid pressure means for operating said fluid pressure operated part comprising a source of supply of fluid, means connected to said source of supply for withdrawing fluid therefrom and delivering a substantially constant quantity of the same, a plurality of conduits, a valve means connected to said second-named means for receiving said fluid therefrom and operable at will to deliver the same to any one of said conduits, a secondary reservoir connected to one of said conduits and to said pressure operated part for delivering thereto fluid received from said conduit whereby said part is supplied with a quantity of fluid, means resisting operation of said pressure operated part on said delivery of said fluid quantity thereto whereby a fluid pressure is generated in said fluid quantity, means connected to said conduit for preventing said generated fluid pressure from raising above a predetermined low pressure, a fluid actuated impressing device for impressing said fluid quantity connected to another of said conduits whereby the said fluid quantity within said secondary reservoir will be subjected to a pressure greater than said predetermined low pressure which, when transmitted through the said fluid quantity, causes the pressure operated clutch part to move against the resistance of said resisting means and to effect frictional engagement between the friction members.

2. A clutch device for interconnecting a rotative element to another element, said clutch device including friction members mounted on the said elements and a fluid pressure operated part for effecting frictional engagement between the friction members, a fluid pressure means for operating said fluid pressure operated part comprising a source of supply of fluid, means connected to said source of supply for withdrawing fluid therefrom and delivering a substantially constant quantity of the same, a plurality of conduits, a valve means connected to said second-named means for receiving said fluid therefrom and operable at will to deliver the same to any one of said conduits, a secondary reservoir connected to one of said conduits and to said pressure operated part for delivering thereto fluid received from said conduit whereby said part is supplied with a quantity of fluid, means resisting operation of said pressure operated part on said delivery of said fluid quantity thereto whereby a fluid pressure is generated in said fluid quantity, means connected to said conduit for preventing said generated fluid pressure from raising above a predetermined low pressure, a fluid actuated impressing device for impressing said fluid quantity connected to another of said conduits and actuated by a second fluid quantity in said other conduit, means connected to said other conduit for preventing fluid pressure of said second fluid quantity from raising above a predetermined high pressure whereby the first-named fluid quantity within a said secondary reservoir will be subjected to a pressure greater than said predetermined low pressure and less than said predetermined high pressure which, when transmitted through said first-named fluid quantity, causes the pressure operated clutch part to move against the resistance of said resisting means and to effect frictional engagement between the friction members.

3. A clutch device for interconnecting a rotative element to another element, said clutch device including friction members mounted on the said elements and a fluid pressure operated part for effecting frictional engagement between the friction members, a fluid pressure means for operating said fluid pressure operated part comprising a source of supply of fluid, means connected to said source of supply for withdrawing fluid therefrom and delivering a substantially constant quantity of the same, a plurality of conduits, a valve means connected to said second-named means for receiving said fluid therefrom and operable at will to deliver the same to any one of said conduits, a secondary reservoir connected to one of said conduits and to said pressure operated part for delivering thereto fluid received from said conduit whereby said part is supplied with a quantity of fluid, means resisting operation of said pressure operated part on said delivery of said fluid quantity thereto whereby a fluid pressure is generated in said fluid quantity, means connected to said conduit for preventing said generated fluid pressure from raising above a predetermined low pressure, a fluid actuated device for displacing and impressing said fluid quantity connected to another of said conduits and actuated by a second fluid quantity in said other conduit of less volume than said first-named fluid quantity, means connected to said other conduit for preventing fluid pressure of said second fluid quantity from raising above a predetermined high pressure whereby the first-named fluid quantity will be displaced from said secondary reservoir toward said clutch part and be subjected to a pressure greater than said predetermined low pressure and less than said predetermined high pressure which, when transmitted through said first-named fluid quantity, causes the pressure operated clutch part to move against the resistance of said resisting means and to effect frictional engagement between the friction members.

4. A liquid pressure operating means for a liquid pressure operated clutch for connecting a rotative element with another element and including a source of supply of liquid, means connected to the source of supply for producing a liquid pressure less than a predetermined high pressure, a pressure device connected to the clutch and to the low pressure-producing means for maintaining a substantially fixed liquid quantity in the clutch, means for connecting the pressure device to the said source for raising the said low pressure of said fixed liquid quantity to a higher pressure for operating the clutch.

5. A clutch fluid operating means including a source of supply of fluid, a fluid pump connected to said source, means connected to said pump for delivering fluid at a pressure less than a predetermined fluid pressure, an operable valve means connected to said first-named means, a second means connected to the valve means for delivering fluid at a pressure less than a second predetermined pressure, said second means maintaining a substantially fixed fluid quantity intermediate the said second means and the clutch at a pressure, and means for raising the fluid pressure of said fixed fluid quantity to operate the clutch.

6. A fluid pressure operated device, a source of supply of fluid, a fluid pump connected to said source of supply, means connected to said pump for delivering fluid at a pressure less than a predetermined fluid pressure, an operable valve means connected to said first-named means for selectively delivering any of a plurality of fluid quantities, a second means connected to said valve means for delivering a quantity of fluid at a pressure less than a second predetermined fluid pressure and said first predetermined pressure, said second means maintaining a substantially fixed fluid quantity intermediate said second means and the device at a pressure, fluid actuated means for raising the fluid pressure of said fixed fluid quantity while maintaining the same at said fixed fluid quantity to operate the device, said last-named means being connected to the said valve means and actuated by another fluid quantity delivered thereby.

7. A fluid pressure operating means for operating a fluid pressure operated clutch for connecting a rotative element to another element, said fluid pressure operating means including a source of supply of fluid, a fluid pump connected to said source, an operable valve means, a part for operating the clutch, means connected to the valve means and to the clutch operating part for maintaining a substantially fixed fluid quantity in the clutch operating part at a predetermined low pressure, means connected to the valve means for raising the fluid pressure of said fluid quantity to operate the clutch while maintaining the fluid at said fixed fluid quantity, said valve means being operable to selectively connect the said second and third named means to the pump.

8. A fluid pressure operating means for operating a fluid pressure operated clutch for connecting a rotative element to another element, said fluid pressure operating means including a source of supply of fluid, a fluid pump connected to said source of supply for delivering a substantially constant quantity from said source of supply, means connected to said pump for delivering fluid at a pressure less than a predetermined fluid pressure notwithstanding variations therein produced on continued delivery of fluid thereto by the pump, an operable valve means connected to the first-named means, a second means connected to the valve means and to the clutch for containing a substantially fixed fluid quantity at a pressure less than a second predetermined pressure and said first-named predetermined pressure, and means for raising the fluid pressure of said fluid quantity to operate the clutch.

9. A fluid operating means for a clutch device for interconnecting a rotative element to another element, said clutch device including friction members mounted on the elements, a fluid operated piston and cylinder for effecting frictional engagement between the friction members, and an expandible sealing gasket mounted in said cylinder, said fluid operating means including a source of supply of fluid, means connected to the cylinder for producing a lesser fluid pressure than a predetermined high pressure of the fluid delivered from the source, whereby a substantially fixed quantity of fluid may be normally maintained in said cylinder at a pressure sufficient to expand said sealing gasket, a fluid pressure operated means for exerting a pressure on said fixed fluid quantity greater than said lesser pressure, and means connected to the source of supply of fluid, the pressure producing means, and the fluid pressure operated means for diverting the fluid from said source to said pressure producing means and to said fluid pressure operated means at will.

FREDRICH J. RODE.
MEREDITH R. HATCH.